US012584608B2

(12) United States Patent
Wang et al.

(10) Patent No.: US 12,584,608 B2
(45) Date of Patent: Mar. 24, 2026

(54) PANEL LIGHT

(71) Applicant: Ningbo Dongxing Electric Co., Ltd., Cixi City (CN)

(72) Inventors: Dingyi Wang, Cixi City (CN); Yiping Yu, Cixi City (CN)

(73) Assignee: Ningbo Dongxing Electric Co., Ltd., Cixi City (CN)

( * ) Notice: Subject to any disclaimer, the term of this patent is extended or adjusted under 35 U.S.C. 154(b) by 0 days.

(21) Appl. No.: 19/272,208

(22) Filed: Jul. 17, 2025

(65) Prior Publication Data

US 2026/0029104 A1 Jan. 29, 2026

(30) Foreign Application Priority Data

Jul. 23, 2024 (CN) ........................ 202421760492.X

(51) Int. Cl.

| | |
|---|---|
| ***F21V 23/00*** | (2015.01) |
| ***F21V 1/22*** | (2006.01) |
| ***F21V 17/10*** | (2006.01) |
| ***F21Y 105/00*** | (2016.01) |

(52) U.S. Cl.

CPC .............. *F21V 1/22* (2013.01); *F21V 17/101* (2013.01); *F21V 23/002* (2013.01); *F21Y 2105/00* (2013.01)

(58) Field of Classification Search

CPC ........................... F21V 23/002; F21Y 2105/00
USPC ........................................................ 362/257
See application file for complete search history.

(56) References Cited

U.S. PATENT DOCUMENTS 10,995,938 B2 * 5/2021 Yu ........................ F21V 17/104

* cited by examiner

*Primary Examiner* — Toan C Ly
(74) *Attorney, Agent, or Firm* — Wang Law Firm, Inc.

(57) ABSTRACT

A panel lamp comprise a lamp housing, a light emitting assembly disposed inside the lamp housing, a lampshade having a top surface disposed under the lamp housing, the lamp housing comprises a roof and a circle of peripheral wall extending downward from an edge of the roof, the lamp housing has a first connecting plate extending outward from an edge of the peripheral wall, the lampshade has a fourth connecting plate extending inward from an edge of the lampshade, and, an accommodating space is defined between the fourth connecting plate and the top surface of the lampshade for the first connecting plate of the lamp housing positioned and located within. The panel lamp of the present invention does not require the additional frame, The lamp housing and the lampshade are directly limited and connected, which simplifies the structure of the panel lamp. In addition, the lampshade is bent and deformed to be clamped with the lamp housing, so the both are connected firmly.

9 Claims, 3 Drawing Sheets

PANEL LIGHT

TECHNICAL FIELD OF THE INVENTION

The present invention relates to the technical field of lamps, and in particular to a panel lamp.

BACKGROUND OF THE INVENTION

As a kind of lighting devices, panel lamps are usually used for indoor lighting, particularly in offices, shopping malls, homes, hospitals and other places requiring uniform lighting. For a conventional panel lamp, a frame is disposed on the periphery of the lamp housing, and a lampshade is fixedly connected to the frame of the lamp housing. The lampshade is generally connected to the frame by snap-fitting, screwing or gluing.

For example, a Chinese Utility Model Patent CN220506593U disclosed an all-plastic panel lamp, comprising a baseplate and a diffuser plate, wherein an accommodating chamber is disposed on the baseplate; a plurality of light source plates and a driving plate are arranged in the accommodating chamber; the light source plates are electrically connected to the driving plate; the driving plate is connected to an input wire; a plurality of lamp beads is arranged on the light source plates; a frame is arranged on the outer side of the periphery of the baseplate; a glue slot is annularly arranged on the surface of the frame facing the light-emitting surface, glue is applied in the glue slot; and, the bottom surface of the diffuser plate is bonded with the frame by the glue.

In the above structure, since the bottom surface of the diffuser plate is bonded with the frame by the glue, the frame structure of the diffuser plate can be hidden, so that only the diffuser plate is exposed on the whole mounting surface and the whole mounting surface is seat and aesthetic. However, there are still the following problems: firstly, the bonding firmness of the glue needs to be verified; moreover, the frame is only invisible on the mounting surface in the above structure, but the frame actually exists, so the structure is redundant.

SUMMARY OF THE INVENTION

It is an object of the present invention to provide a frame-free panel lamp with simple structure and firm connection.

To achieve the above object, the panel lamp comprises a lamp housing, a light emitting assembly disposed inside the lamp housing; a lampshade having a top surface disposed under the lamp housing; wherein, the lamp housing comprises a roof and a circle of peripheral wall extending downward from an edge of the roof; the lamp housing has a first connecting plate extending outward from an edge of the peripheral wall; the lampshade has a fourth connecting plate extending inward from an edge of the lampshade; and, an accommodating space is defined between the fourth connecting plate and the top surface of the lampshade for the first connecting plate of the lamp housing positioned and located within.

To facilitate machining, preferably, the lamp housing is a metal housing, the lampshade is a plastic plate, and the fourth connecting plate is formed from the lampshade by thermal deformation. The thermal deformation of plastics mainly involves treatment methods for thermoplastic plastics and thermosetting plastics and is a conventional processing method. In this implementation, since the lamp housing is a metal housing and the temperature for thermal deformation of plastics is generally much lower than the thermal processing temperature of the metal, the thermal deformation on the lampshade has no adverse effects on the lamp housing.

To reduce the difficulty in forming the fourth connecting plate in the thermal deformation process, preferably, the roof of the lamp housing is rectangular, and the lampshade is correspondingly rectangular and has four side edges; four fourth connecting plates respectively extend from each side edge of the lampshade, and two adjacent fourth connecting plates are separated to form a second gap between the ends of two adjacent fourth connecting plates. It is only necessary to thermally deform four side edges of the rectangular lampshade, and each side edge can be bent simply. In other implementations, the lampshade may also be a polygon with other numbers of side edges. During the thermal deformation of each side edge of the lampshade, the lampshade plastic plate is redundant at the corners of adjacent side edges, so the lampshade plastic plate at the corners of adjacent side edges of the lampshade can be removed before thermal deformation. For example, a square lampshade plastic plate is removed at each corner, so that two adjacent fourth connecting plates are separated to form a second gap between the ends of two adjacent fourth connecting plates.

To reduce the difficulty in thermal deformation, preferably, the lamp housing has a second connecting plate extending upward from an edge of the first connecting plate; the lampshade has a third connecting plate extending upward from an edge of the lampshade, and the fourth connecting plate extends inward from an edge of the third connecting plate; the second connecting plate has a top edge resisting against a bottom of the fourth connecting plate, and a bottom edge resisting against the top surface of the lampshade.

Preferably, the fourth connecting plate is formed from the third connecting plate by thermal deformation. The third connecting plate may be integrally stamped with the lampshade. During assembling, it is only necessary to thermally deform the third connecting plate to form the fourth connecting plate.

Preferably, the third connecting plate is formed from the lampshade by thermal deformation. In some embodiments, both the fourth connecting plate and the third connecting plate are formed by thermal deformation.

Preferably, the roof of the lamp housing is rectangular, and the lampshade is correspondingly rectangular; the lampshade has four side edges, four third connecting plates respectively extend from each side edge of the lampshade, and four fourth connecting plates respectively extend from each third connecting plate; two adjacent fourth connecting plates are separated to form a second gap between the ends of two adjacent fourth connecting plates; and two adjacent third connecting plates are separated to form a first gap between the ends of two adjacent third connecting plates.

Preferably, the peripheral wall extends downward and outward from the edge of the roof, and at least two hooks are disposed on two opposite sidewalls in the circle of peripheral wall.

Preferably, a wiring box is disposed on a sidewall of the peripheral wall, and the sidewalls on which the hooks are located are adjacent to the sidewall on which the wiring box is located.

Compared with the prior art, in the present invention, the edge of the peripheral wall of the lamp housing is directly positioned and located within the accommodating space which is defined between a folding edge (the fourth connecting plate) folded from the edge of the lampshade and the top surface of the lampshade, that is, the lamp housing is directly connected to the lampshade, then no additional frame like traditional panel lamp is required in the panel lamp of the present invention, so that the structure of the panel lamp is simplified. In addition, the edge of the lampshade is bent and deformed to be clamped with the lamp housing, therefore the lamp housing and the lampshade are connected to each other firmly.

DETAILED DESCRIPTION OF THE INVENTION

Figure 1:
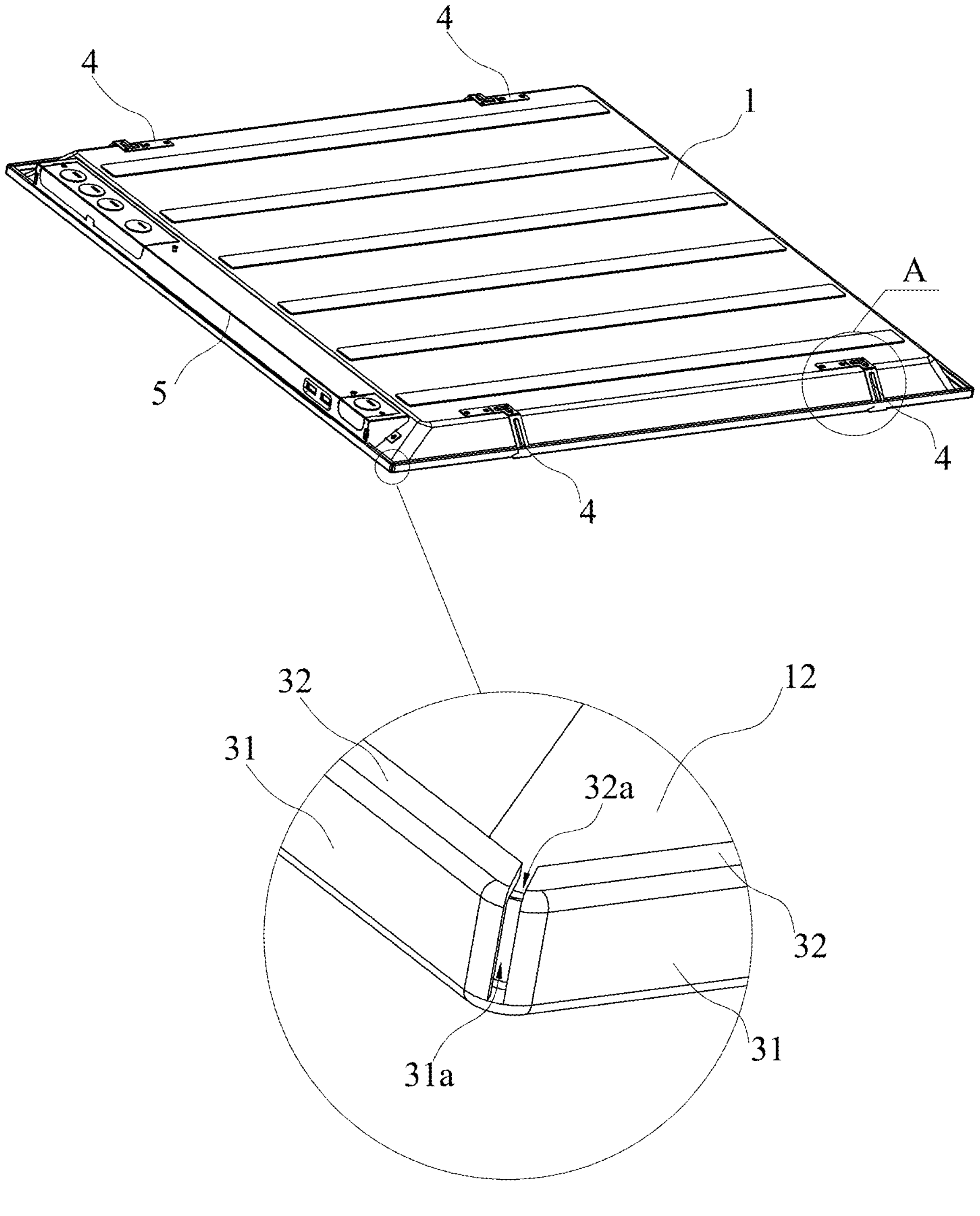
FIG. 1 is a perspective view with an enlarge view of a panel lamp according to an embodiment of the present invention.
Figure 2:
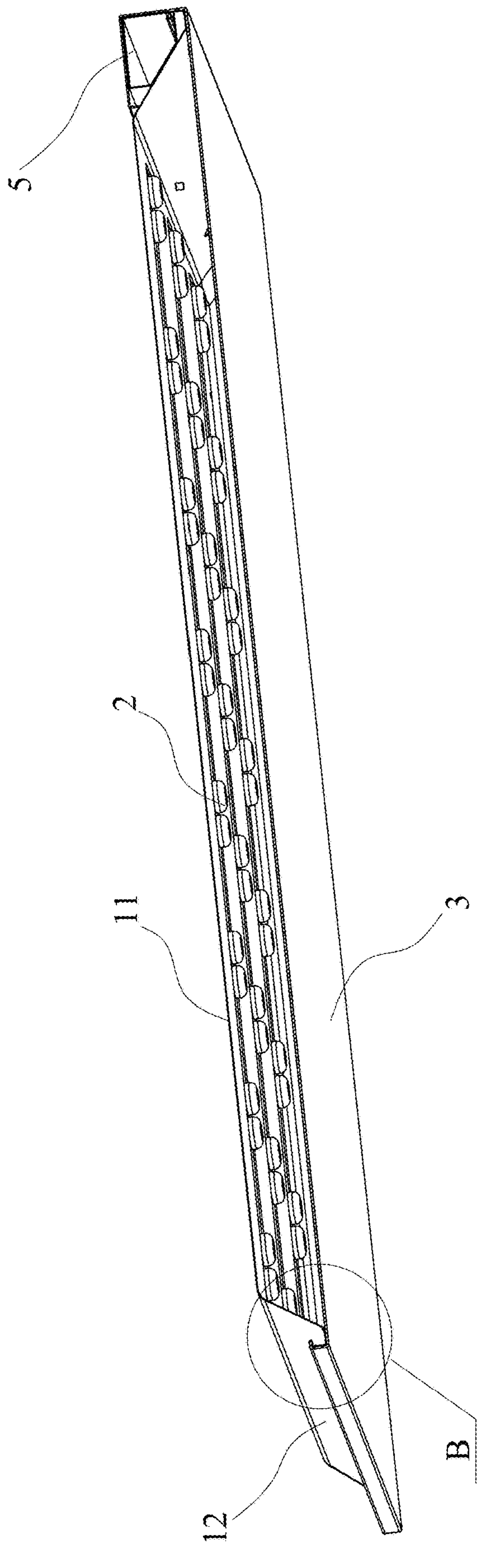
FIG. 2 is a sectional view of the panel lamp according to an embodiment of the present invention.

The present invention will be further described below in detail by embodiments with reference to the accompanying drawings.

It should be noted that in the description and claims of the present invention, the terms used to indicate direction, such as "front, back", "up, down", "left, right", "side, top, bottom", etc. are used to describe structures and elements of the present invention for better explanation. And these terms used here are based on an orientation in the accompanying drawings. Since the embodiments disclosed by the present invention can be set in different directions, these terms indicating directions are only used as explanations and should not be used as restrictions. For example, the verbs "up", "down" should not be limited to the direction opposite or consistent with the gravity.

FIGS. 1-4 show a preferred embodiment of the panel lamp of the present invention. The panel lamp comprises a lamp housing 1, a light emitting assembly 2 disposed inside the lamp housing 1 and a lampshade 3 disposed under the lamp housing 1.

The lamp housing 1 is a metal housing, has a rectangular roof 11 and a circle of peripheral wall 12 extending downward from an edge of the roof 11. The lamp housing 1 has a circle of first connecting plate 121 extending outward from an edge of the peripheral wall 12, and a circle of second connecting plate 122 extending upward from an edge of the first connecting plate 121, and the fourth connecting plate 32 extends inward from an edge of the third connecting plate 31.

The lampshade 3 is a plastic plate and is roughly rectangular with four side edges and a top surface 3*a*. The lampshade 3 has four third connecting plates 31 extending upward from each side edge of the lampshade 3, and four fourth connecting plates 32 bending and extending inward from an edge of each third connecting plate 31, so that an accommodating space S with a U-shaped section is defined between each fourth connecting plate 32 and the top surface 3*a* of the lampshade 3. The circle of second connecting plate 122 of the lamp housing 1 are positioned and located within the corresponding accommodating space S between the fourth connecting plates 32 and the top surface 3*a* of the lampshade 3. Specifically, the second connecting plate 122 has a top edge 122*a* resisting against a bottom of the corresponding fourth connecting plate 32, and a bottom edge 122*b* resisting against the top surface 3*a* of the lampshade 3, accordingly the circle of second connecting plate 122 is reliably positioned within the corresponding accommodating space S and will not be loosened arbitrarily. The fourth connecting plate 32 is formed from the third connecting plate 31 by thermal deformation, and the third connecting plate 31 may be integrally stamped with the lampshade 3 or be formed from the lampshade 3 by thermal deformation.

On the lampshade 3, two adjacent third connecting plates 31 are separated to form a first gap 31*a* between the ends of two adjacent third connecting plates 31, and two adjacent fourth connecting plates 32 are separated to form a second gap 32*a* between the ends of two adjacent fourth connecting plates 32. In this embodiment, both the third connecting plates 31 and the fourth connecting plates 32 are formed by thermal deformation. The lampshade plastic plate at corners of adjacent edges of the lampshade is removed before thermal deformation. For example, a square lampshade plastic plate is removed at each corner. At the end of thermal deformation, two adjacent third connecting plates 31 are separated to form a first gap 31*a* between the ends of two adjacent third connecting plates 31. With regard to the fourth connecting plates 32, the plastic plate of the lampshade 3 is also removed in a similar way before thermal deformation, so that two adjacent fourth connecting plates 32 are separated to form a second gap 32*a* between the ends of two adjacent fourth connecting plates 32.

Figure 3:
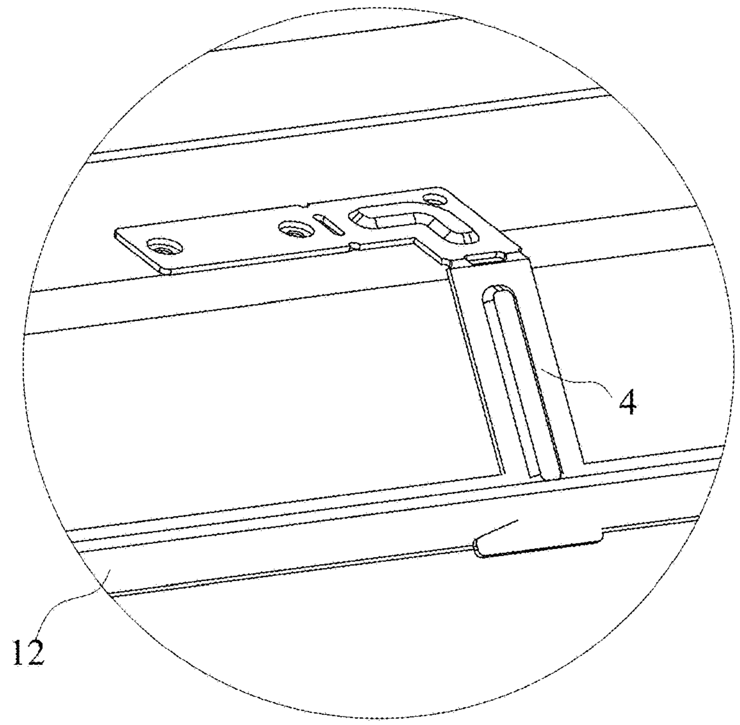
FIG. 3 is an enlarged view of part-A in FIG. 1.
Figure 4:
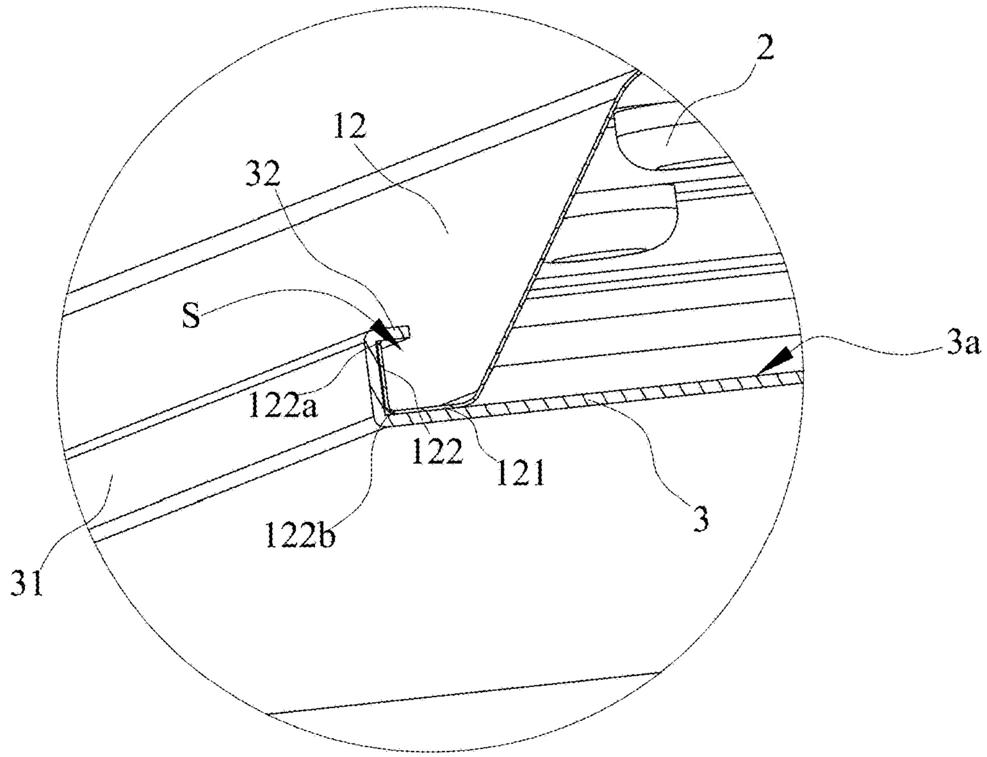
FIG. 4 is an enlarged view of part-B in FIG. 2.

In addition, as shown in FIGS. 1 and 3, four hooks 4 are disposed on two opposite sidewalls in the circle of peripheral wall 12. In this embodiment, each hook 4 is L-shaped, and the end of each hook 4 is connected to a sidewall of the peripheral wall 12. And, a wiring box 5 is disposed on the sidewall of the peripheral wall 12, and the sidewalls on which the hooks 4 are located are adjacent to the sidewall on which the wiring box 5 is located.

The invention claimed is:

1. A panel lamp, comprising:

a lamp housing;

a light emitting assembly disposed inside the lamp housing;

a lampshade having a top surface disposed under the lamp housing;

wherein, the lamp housing comprises a roof and a circle of peripheral wall extending downward from an edge of the roof;

the lamp housing has a first connecting plate extending outward from an edge of the peripheral wall;

the lampshade has a fourth connecting plate extending inward from an edge of the lampshade;

and, an accommodating space is defined between the fourth connecting plate and the top surface of the lampshade for the first connecting plate of the lamp housing positioned and located within.

2. The panel lamp of claim 1, wherein the lamp housing is a metal housing, the lampshade is a plastic plate, and the fourth connecting plate is formed from the lampshade by thermal deformation.

3. The panel lamp of claim 2, wherein the roof of the lamp housing is rectangular, and the lampshade is correspondingly rectangular and has four side edges;

four fourth connecting plates respectively extend from each side edge of the lampshade, and two adjacent fourth connecting plates are separated to form a second gap between the ends of two adjacent fourth connecting plates.

4. The panel lamp of claim 1, wherein the lamp housing has a second connecting plate extending upward from an edge of the first connecting plate;

the lampshade has a third connecting plate extending upward from an edge of the lampshade, and the fourth connecting plate extends inward from an edge of the third connecting plate;

the second connecting plate has a top edge resisting against a bottom of the fourth connecting plate, and a bottom edge resisting against the top surface of the lampshade.

5. The panel lamp of claim 4, wherein the fourth connecting plate is formed from the third connecting plate by thermal deformation.

6. The panel lamp of claim 4, wherein the third connecting plate is formed from the lampshade by thermal deformation.

7. The panel lamp of claim 4, wherein the lampshade has four side edges, four third connecting plates respectively extend from each side edge of the lampshade, and four fourth connecting plates respectively extend from each third connecting plate;

and two adjacent third connecting plates are separated to form a first gap between the ends of two adjacent third connecting plates.

8. The panel lamp of claim 1, wherein the peripheral wall extends downward and outward from the edge of the roof, and at least two hooks are disposed on two opposite sidewalls in the circle of peripheral wall.

9. The panel lamp of claim 8, wherein a wiring box is disposed on a sidewall of the peripheral wall, and the sidewalls on which the hooks are located are adjacent to the sidewall on which the wiring box is located.

* * * * *